Patented Apr. 10, 1945

2,373,483

UNITED STATES PATENT OFFICE 2,373,483

PREPARATION OF ORGANIC ESTERS

Donald John Loder, Wilmington, Del., assignor to E. I. du Pont de Nemours & Company, Wilmington, Del., a corporation of Delaware No Drawing. Original application August 5, 1939, Serial No. 288,585. Divided and this application July 18, 1942, Serial No. 451,498

6 Claims. (Cl. 260—484)

This invention relates to a process for the preparation of organic esters and more particularly to the preparation of esters of alkoxy organic acids from ethers and alpha-hydroxy aliphatic organic acids or their derivatives. This application is a division of application Serial No. 288,585, U. S. Patent No. 2,302,618.

An object of the present invention is to provide an improved process for the preparation of alpha-hydroxy aliphatic organic acid esters in which the hydrogen of the hydroxyl group has been replaced by an aliphatic, aromatic, cyclic or alicyclic group. Another object of the invention is to provide an economical process for the preparation of alkoxy substituted acetic acids and their esters from inexpensive raw materials. Yet another and more specific object is to provide a process for the preparation of alkoxy acetic acid esters, wherein aliphatic ethers are interacted with hydroxy acetic acid or its esters; with glycolides; or with formaldehyde and carbon monoxide. A further object is to provide suitable catalysts for these processes. Other objects and advantages of the invention will hereinafter appear.

The above objects, and other advantages of the invention which will hereinafter be more fully particularized, are realized by the interaction of a symmetrical or unsymmetrical ether with (1) an alpha-hydroxy aliphatic carboxylic acid or an ester, or (2) an anhydride thereof, preferably in the presence of a suitable catalyst. The reactions appear to proceed substantially in accord with the following equations:

(1)   ROR+R$_1$CH(OH)COOR$_1$→
                    R$_1$CH(OR)COOR$_1$+ROH (2)   ROR+(OCH$_2$CO)$_x$→CH$_2$(OR)COOR wherein R designates similar or dissimilar alkyl, aryl, aralkyl, acyl, heterocyclic or alicyclic groups, R$_1$ is a hydrogen or a hydrocarbon radical, and $x$ is an integer greater than 1. In Reaction 1 a hydroxy acid will react with an ether to form an alkoxy ester and if an acid is reacted with the ether esters of alpha-hydroxy carboxylic acids may also be obtained as by-products of the reaction. In Reaction 2 esters of alkoxy acetic acids are obtained from ethers and glycolide.

The following equation illustrates the process more specifically with reference to the interaction of dimethyl ether with methyl hydroxy acetate:

(3)   CH$_3$OCH$_3$+CH$_2$(OH)COOCH$_3$→
              CH$_2$(OCH$_3$)COOCH$_3$+CH$_3$OH

Thus, from dimethyl ether and methyl hydroxy acetate, methyl methoxy acetate is obtained and, in a similar manner, from the diethyl, dipropyl, dibutyl and higher symmetrical ethers, ethyl ethoxy, propyl propoxy, butyl butoxy and the higher alkoxy acetates, respectively, are produced. In like manner from the same ethers and alkyl lactates are obtained methyl methoxy, ethyl ethoxy, propyl propoxy, butyl butoxy and the higher alkoxy lactates.

The above enumerated reactions and similar reactions may, broadly speaking, be conducted by placing the ether and the alpha-hydroxy acid, its ester, or anhydride in a suitable vessel, preferably with a catalyst.

The reaction is effected at temperatures ranging from 100° to in the neighborhood of 300° C., the preferred range for the interaction of lower ethers, i. e., methyl, ethyl, propyl and butyl ethers with carbon monoxide being between 200 and 230° C. Atmospheric pressures may be used, although, in order to increase the velocity of the reaction, it is recommended that pressures in excess of atmospheric be used. Thus, elevated pressures ranging between 5 and 1500 atmospheres or more are suitable, with a preferred range between 30 and 700 atmospheres, said preferred range of pressures being employed with the preferred catalyst concentrations hereinafter designated. While specific ranges of temperatures and pressures have been indicated, the reaction may be effected over wide ranges, the optimum conditions varying with the particular ether and hydroxy acid or derivative reacted and the activity and concentration of the catalyst, if any, employed.

As may be inferred from the above general formulas, a large number of ethers are available for reaction with the hydroxy acids or their derivatives, in accord with the invention. The reaction is applicable to the treatment of ethers generally, such, for example, as dimethyl ether, methyl ethyl ether, diethyl ether, diisopropyl ether, dibutyl ether, diisobutyl ether, di-inactive amyl ether, diisoamyl ether, dioctyl ether, diallyl ether, dibenzyl ether, diphenyl ethyl ether, and the dibutene ethers. Mono- and polyethers of the polyhydric alcohols may likewise be used such, for example, as the ethers conforming to the formula ROC$_n$H$_{2n}$OR$_1$ in which $n$ is an integer greater than 1 and R and R$_1$ are either alkyl, aryl, or hydrogen, examples of which are monomethyl, ethyl, propyl, and butyl ethers of ethylene, propylene and diethylene glycols. The ether esters of the glycols are also suitable such, for example, as the acetates and propionates of the monoalkyl ethers of the above designated glycols. Such ethers as the alkoxy methoxy ethanols can likewise be used.

As previously stated, alpha hydroxy aliphatic carboxylic acids, their esters and anhydrides, in general, may be reacted with the ethers. The hydroxy acetic acid esters which may be reacted include the hydroxy acetic acid esters of methanol, ethanol, n- and isopropanol, n- and isobutanol, amyl alcohol, and the higher straight and branched chain alcohols. The glycolides, polyglycolides and other anhydrides of hydroxy acetic acid may also be used, such for example, as diglycolic acid, O—(CH$_2$COOH)$_2$; diglycolic anhydride, O—(CH$_2$CO)$_2$—O; glycolic anhydride, CH$_2$(OH)COO.CH$_2$COOH; glycolide,

polyglycolide, (OCH$_2$CO)$_x$, and the like. These glycolides, anhydrides of hydroxy acetic acid or polyglycolides may be considered as esters of hydroxy acetic acid and will be so regarded in this specification and the claims appended thereto. Similar esters and anhydrides of the higher alpha-hydroxy aliphatic carboxylic acids may likewise be used such, for example, as the lactic acid esters, lactides and other anhydrides, the lactides and anhydrides being considered herein as esters.

In order to increase the velocity of the reaction it is recommended that a catalyst be employed. In general, the catalyst may be used in amounts ranging up to in the order of 1 mole thereof per mole of the ether. Acidic substances, generally, that is, those which give in an aqueous medium a pH of less than 7 are suitable for catalyzing the reaction. Catalysts which are applicable include, for example, the inorganic acids and, more particularly, hydrochloric, sulfuric and phosphoric acids or mixtures thereof; inorganic acidic salts such, for example, as potassium acid sulfate, sodium acid sulfate; the non-metal halides, such as boron fluoride and boron chloride, etc.; organic acids and organic acid salts may likewise be employed, such, for example, as oxalic, malonic acids and their salts.

When boron fluoride is used as the catalyst, it has been found that it may first be combined with the ether to be reacted and the mixture (which, for the sake of convenience, will be called a complex) reacted with the hydroxy acetic acid or glycolide. It is not necessary that all of the ether to be reacted be combined with the boron fluoride for the reaction proceeds satisfactorily if an ether-boron fluoride complex is present in the ratio of from 1 to 10 moles thereof per 100 moles of the ether derivative. Complexes of boron fluoride with other compounds such, for example, as complexes of boron fluoride with water (containing, for example, from 1 to 5 moles of water per mole of boron fluoride) methanol, methyl methoxy acetate, glycolide and the like may likewise be employed. When so used from 0.5 mole to 1 mole of the boron fluoride may be employed per mole of ether, for example. Higher proportions may be used, but, generally, those indicated in the designated range cover the more practical ratios. The preferred range for use when the hereinbefore designated preferred temperatures and pressures are employed is between approximately 25 and 75 moles of boron fluoride per 100 moles of the ether.

In lieu of reacting the ether with hydroxy acetic acid, its esters or glycolides, the ether may, as stated, be reacted with formaldehyde and carbon monoxide. As shown in the application of D. J. Loder, Serial No. 229,875, filed September 14, 1938, U. S. Patent No. 2,211,625, hydroxy acetic acid esters are produced, in the presence of alcohols, formaldehyde and carbon monoxide, and it has been found that if ethers are employed in lieu of the alcohols, or in conjunction with them, alkoxy substituted acetic acids are prepared. Under the conditions of such a reaction the dimethyl ether should preferably be present in excess and in the ratio of from 1 to 5 moles of the ether per mole of the formaldehyde, although stoichiometrically equimolar proportions are indicated. Under these circumstances the more expensive aldehyde is completely reacted while the ether may be recovered from the reaction product and recycled through the system.

The reaction product obtained when dimethyl ether is reacted with hydroxy acetic acid, its esters or glycolides, in accord with the invention, consists essentially of methyl methoxy acetate, together with the catalyst and unreacted dimethyl ether. The product is separated from the catalyst by fractional distillation, preferably under reduced pressures, during which the dimethyl ether and the alkoxy acetate are removed by distillation and separated from each other by proper fractionation. It is usually desirable to carry the separation only to partial completion, allowing a part of the alkoxy acetate product, together with the catalyst, to remain in the residue which is recycled to the reaction zone for further treatment with added raw materials.

An alternate method of separation, which may be used if boron fluoride is the catalyst, involves the displacement of the alkoxy acetate from its complex with boron fluoride by the addition of calcium fluoride thereto. The calcium fluoride appears to have a greater affinity for the boron fluoride than do the alkoxy acetates, and, after the addition of calcium fluoride, the alkoxy acetate may be readily recovered therefrom by distillation under reduced pressure, leaving as a residue a calcium fluoride-boron fluoride complex from which boron fluoride may be recovered in accord with the process described by R. E. Schultz in U. S. Patent 2,135,458.

Examples will now be given to illustrate preferred forms of the invention, although it will be understood that the invention is not limited to the details therein given. The parts designated are by weight unless otherwise indicated and the yields are based on the hydroxy acetic acid used.

*Example 1.*—A mixture consisting of 68.8 parts of 40% dehydrated hydroxy acetic acid, 207 parts of dimethyl ether and 15.6 parts of boron fluoride dihydrate, BF$_3$(H$_2$O)$_2$, was charged into a silver-lined pressure vessel. The whole was heated at 200° C. with agitation under autogenous pressure for 1 hour. The product was discharged from the cooled reaction vessel and the boron fluoride was neutralized by potassium carbonate. Fractional distillation of the product under 50 mm. of mercury pressure gave methyl methoxyacetate (B. P. 50 mm., 57° C.) in 45% yield.

*Example 2.*—A reaction mixture comprising 315 parts of methyl hydroxyacetate, 322 parts of dimethyl ether, and 6.5 parts of sulfuric acid was heated in a silver-lined pressure vessel with agitation for 2 hours at 225° C. Treatment of the product as described in Example 1 gave methyl methoxyacetate in 40% yield.

*Example 3.*—A silver-lined pressure vessel, lined with silver, was charged with 180 parts of methyl hydroxyacetate, 276 parts of dimethyl ether, and 31.2 parts of boron fluoride dihydrate. The mixture was heated with agitation for 2 hours at 225° C. under autogenous pressure. Methyl methoxyacetate, isolated as described above, was produced in 33% yield.

*Example 4.*—A reaction mixture consisting of 45 parts of paraformaldehyde, 82 parts of dimethyl ether and 11.4 parts of dimethyl ether-boron fluoride complex was processed under 700 atmospheres CO pressure for 2 hours at 200° C. in a copper-lined pressure vessel. The product was treated with aqueous sodium bicarbonate to neutralize the boron fluoride catalyst. Methyl methoxyacetate was isolated by extraction with ether and subsequent distillation.

From a consideration of the above specification it will be appreciated that many changes may be made in the details therein given without departing from the scope of the invention or sacrificing any of the advantages obtained therein.

I claim:

1. A process for the preparation of an alkyl alkoxy acetate which comprises reacting an alkyl ether with formaldehyde and carbon monoxide in the presence of an acidic catalyst at a temperature between 100 and 300° C. and at a pressure between 5 and 1500 atmospheres.

2. The process of claim 1 conducted in the presence of a catalyst which gives, in an aqueous medium, a pH of less than 7.

3. The process of claim 1 conducted in the presence of boron fluoride as the catalyst.

4. A process for the preparation of methyl methoxy acetate which comprises interacting methyl ether with formaldehyde and carbon monoxide in the presence of an acidic catalyst at a temperature between 100 and 300° C. and at a pressure between 30 and 700 atmospheres.

5. A process for the preparation of ethyl ethoxy acetate which comprises interacting ethyl ether with formaldehyde and carbon monoxide in the presence of an acidic catalyst at a temperature between 100 and 300° C. and at a pressure between 30 and 700 atmospheres.

6. A process for the preparation of methyl methoxy acetate which comprises introducing carbon monoxide into a mixture having the approximate composition: 45 parts of paraformaldehyde, 82 parts of dimethyl ether and 11.4 parts of dimethyl ether-boron fluoride complex and effecting the reaction at a pressure of 700 atmospheres and at a temperature of approximately 200° C.

DONALD JOHN LODER.